United States Patent
Mladenov et al.

(10) Patent No.: US 10,868,622 B2
(45) Date of Patent: Dec. 15, 2020

(54) CONTROL AND DATA MULTIPLEXING

(71) Applicant: Intel IP Corporation, Santa Clara, CA (US)

(72) Inventors: Todor M. Mladenov, Ottobrunn (DE); Helmut Reinig, Isen (DE); Simona Bernardi, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 662 days.

(21) Appl. No.: 15/630,368

(22) Filed: Jun. 22, 2017

(65) Prior Publication Data
US 2018/0375602 A1 Dec. 27, 2018

(51) Int. Cl.
H04J 3/00 (2006.01)
H04L 12/933 (2013.01)
H04L 12/863 (2013.01)
H04L 12/707 (2013.01)

(52) U.S. Cl.
CPC ............. *H04J 3/00* (2013.01); *H04L 49/109* (2013.01); *H04L 45/24* (2013.01); *H04L 47/628* (2013.01)

(58) Field of Classification Search
CPC ......... H04J 3/00; H04L 47/628; H04L 49/109
See application file for complete search history.

(56) References Cited

U.S. PATENT DOCUMENTS

2019/0014577 A1\* 1/2019 Yang ..................... H04L 5/0053

OTHER PUBLICATIONS

Reinig et al., "Interconnect Network Supporting Multiple Consistency Mechanisms, Multiple Protocols, and Multiple Switching Mechanisms", U.S. Appl. No. 15/373,033, filed Dec. 8, 2016, 85 pages.

\* cited by examiner

*Primary Examiner* — Zhiren Qin
(74) *Attorney, Agent, or Firm* — Schwabe, Williamson & Wyatt, P.C.

(57) ABSTRACT

Embodiments of the present disclosure may relate to an apparatus with a first component and a second component coupled with the first component by a plurality of signal wires. A first wire of the plurality of signal wires may be to carry a command byte of a packet and a first data byte of the packet from the first component to the second component. A second wire of the plurality of signal wires may be to carry a second data byte of the packet from the first component to the second component when the first signal wire carries the command byte of the packet and carry a third data byte of the packet from the first component to the second component when the first signal wire carries the first data byte of the packet. Other embodiments may be described or claimed.

20 Claims, 7 Drawing Sheets

CONTROL AND DATA MULTIPLEXING

FIELD

Embodiments of the present disclosure generally relate to the field of control and data multiplexing, and more particularly, for such multiplexing in a Network on Chip (NoC) context.

BACKGROUND

Legacy NoCs (or, in general, on-chip interconnects) may use one of two techniques for packet transport and switching. In one technique, control elements of the packet and data elements of the packet may be multiplexed separately. That is, control (which may also be referred to as "header") portions of the packet may be transmitted on a first set of wires, and data parts of the packet may be transmitted on a second set of wires. This solution may provide relatively low latency for a first flit of packet data, and higher data throughput (dependent on the overall length of the packet). However, this solution may require a larger physical area for the NoC and longer critical paths due to circuit complicity and higher physical routing congestion.

An alternative technique may be common multiplexing of control and data elements of the packet. That is, control elements of the packet and data elements of the packet may be transmitted along the same set of wires (i.e., time multiplexed control and data). This technique may reduce physical area of the NoC and physical routing congestion, but may result in lower data throughput and increased latency of the first flit of the packet.

Because of the relative advantages and disadvantages of the above two solutions, it may be difficult to generate a single NoC architecture that spans both ends of the design space: from large area and high throughput to small area and moderate throughput. Such an architecture may be desirable because some System on Chip (SoC) designs may include clusters with diagonal requirements with respect to area and data throughput. It may be desirable to meet the requirements of these SoC designs using a single NoC architecture.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
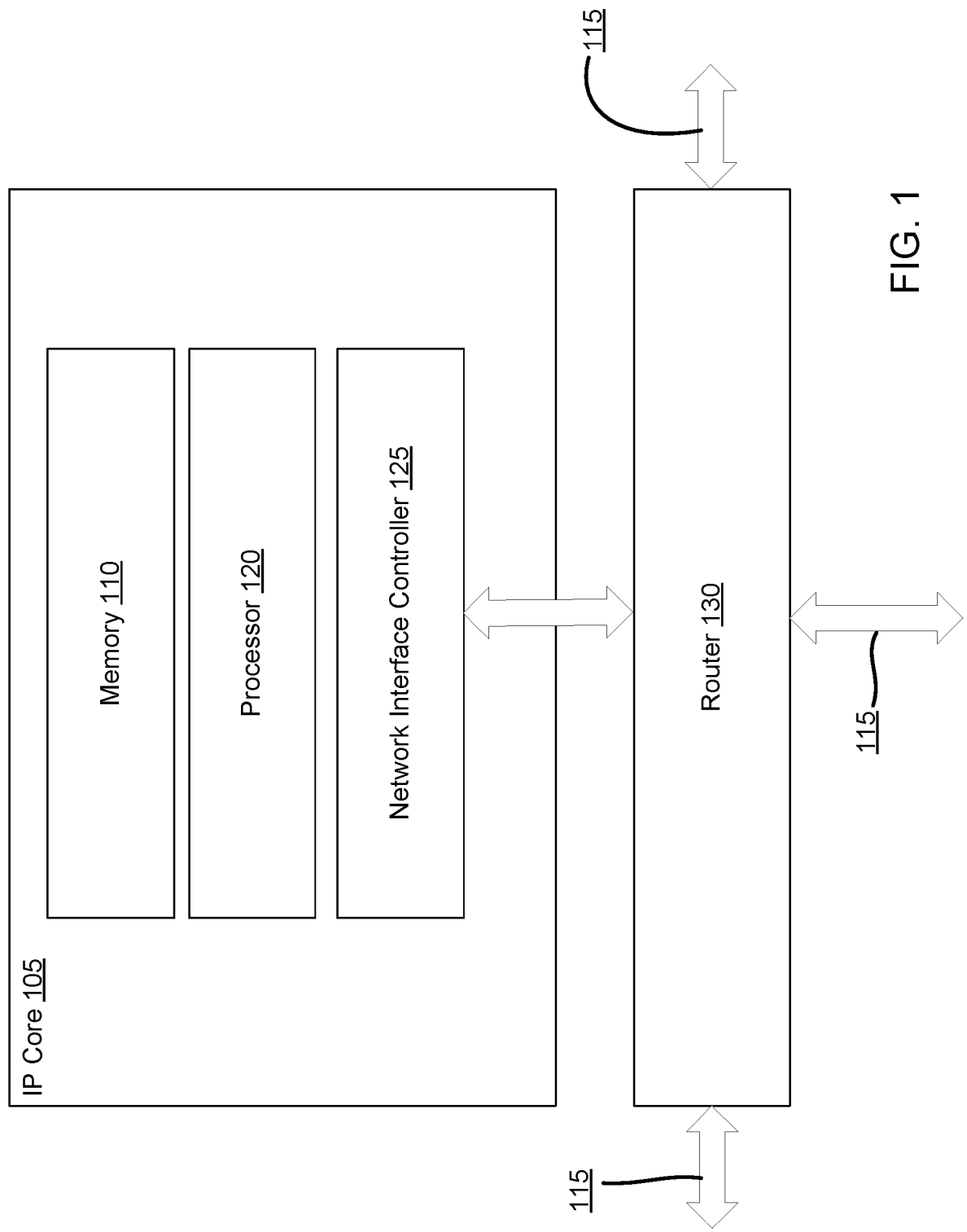
FIG. 1 depicts an example of an intellectual property (IP) core and a router of a NoC, in accordance with various embodiments.

Generally, embodiments herein relate to a technique for packet transmission that allows transporting data (e.g., payload) elements of a packet over the same wires that control (e.g., header) elements of the packet are transmitted. This technique may also allow for mix and match of different interface sizes, as well as techniques for flow controls and/or switching.

More specifically, embodiments may relate to an apparatus with a first component and a second component coupled with the first component by a plurality of signal wires. The apparatus may be, for example, a chip such as a SoC. The wires may be wires of a NoC, and the components may be IP cores of the NoC. A first wire of the plurality of signal wires may carry a control byte of a packet and a first data byte of the packet from the first component to the second component. A second wire of the plurality of signal wires may be to carry a second data byte of the packet from the first component to the second component when the first signal wire carries the control byte of the packet; and carry a third data byte of the packet from the first component to the second component when the first signal wire carries the first data byte of the packet.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Generally, a NoC may be made up of a plurality of IP cores that are communicatively coupled to one another. The IP cores may also be referred to as IP blocks, and in some cases may be denoted as "integrated processor" blocks. Generally, an IP core may designate a reusable unit of logic, cell, or chip layout design. In some embodiments, an IP core may be an ASIC design, a field programmable gate array (FPGA), an application-specific standard part (ASSP), or some other type of design.

FIG. 1 depicts an example of an IP core 105 and a router 130 of a NoC, in accordance with various embodiments. In embodiments, the IP core 105 may include a memory 110, a processor 120, and a network interface controller (NIC) 125. In embodiments, the memory 110 may be, for example, a random access memory (RAM), a read-only memory (ROM), a flash memory, dynamic random access memory (DRAM), or some other type of memory. The memory 110 may be referred to as a non-transitory computer-readable memory. The processor 120 may be some form of programmable processor, microprocessor, processor core, or some other type of processor that is able to execute instructions. The instructions may be stored on the memory 110 or some other memory that is communicatively coupled with the processor 120.

The processor may also be coupled with the NIC 125. Generally, the NIC 125 may be able to process packets received from the processor 120, convert them to a network packet format, and facilitate transmission of the packet from a router such as router 130 to another IP core 105 of the NoC. In some embodiments, the NIC 125 may be considered an element of the IP core 105, as shown in FIG. 1, while in other embodiments the NIC 125 may be considered to be an element separate from the IP core 105.

The NIC 125 may be communicatively coupled with the router 130. The router 130 may be configured to transmit and receive packets via one or more signal buses such as signal buses 115. As will be discussed in greater detail, signal buses 115 may be composed of a plurality of signal wires. For example, the signal buses may in some embodiments have between 18 and 576 signal wires. Other embodiments may have more or fewer signal wires. As can be seen in FIG. 1, the router 130 may be coupled with a plurality of signal buses 115. For example, FIG. 1 shows the router 130 coupled with three signal buses 115. In other embodiments the router may be coupled with more or fewer signal buses 115. Additionally, as will be discussed in greater detail, one or more of the signal buses 115 may include a different number of signal wires than another of the signal buses 115.

Figure 2:
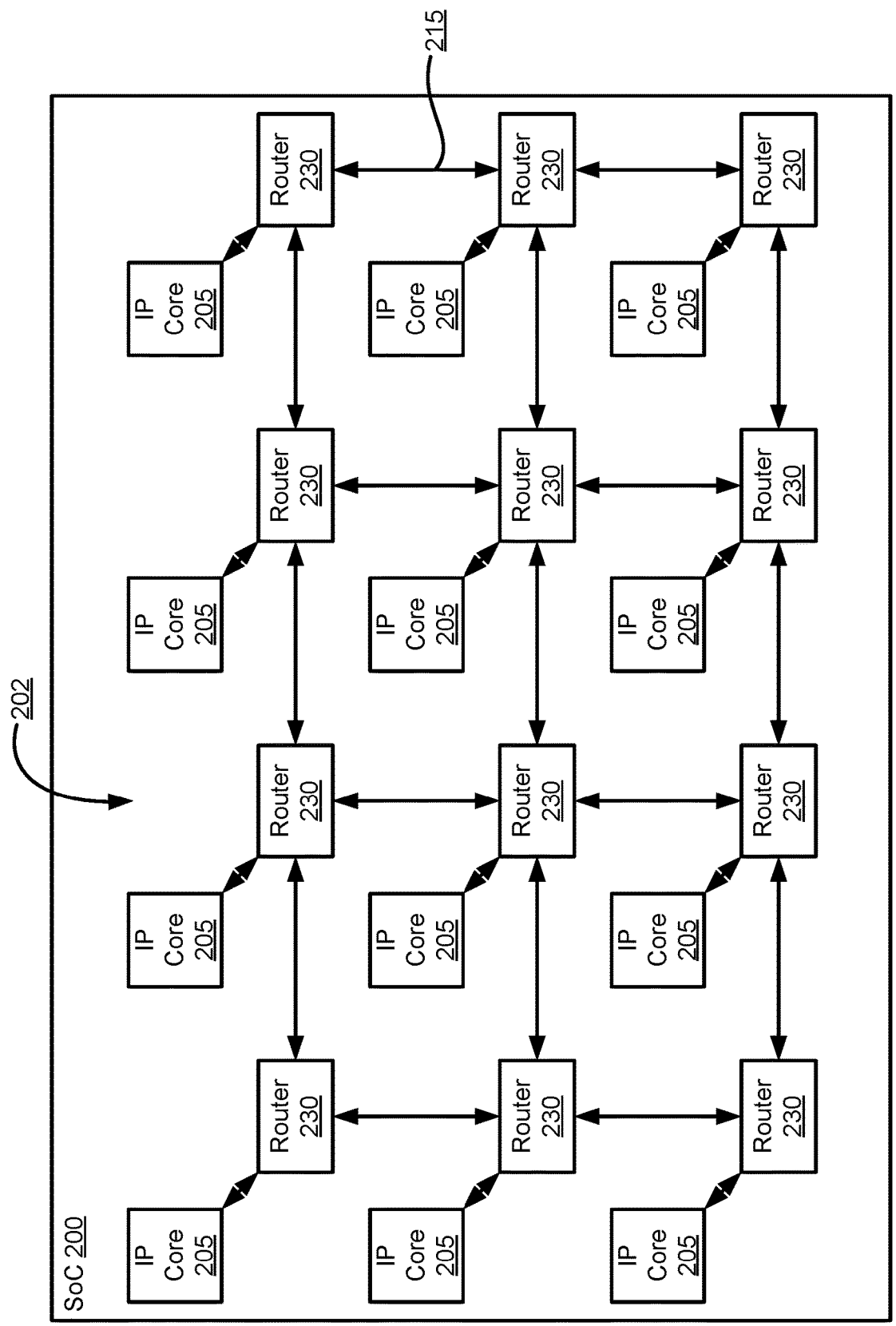
FIG. 2 depicts an example of a NoC, in accordance with various embodiments.

FIG. 2 depicts an example of a SoC 200 with a NoC 202. The SoC 200 may include other elements than the NoC 202 such as one or more microprocessors, memory, a graphics processing unit (GPU), a Wi-Fi module, or other digital, analog, mixed-signal, or radio-frequency (RF) functions. In embodiments, the NoC 202 may provide communicative coupling between the IP cores such as IP cores 205 (described in greater detail below) and the other elements.

The NoC 202 may include a plurality of IP cores 205, which may be similar to IP core 105. Respective ones of the IP cores 205 may be communicatively coupled with a router 230, and the routers 230 may be coupled via signal bus 215 (which may be similar to signal bus 115).

The NoC 202 depicted in FIG. 2 may be referred to as a NoC with a direct topology, that is, a topology wherein a respective router is coupled with a single IP core. More specifically, the NoC 202 may be referred to as a two dimensional (2-D) grid. However, the NoC 202 depicted in FIG. 2 is intended as an example embodiment and other embodiments may include other topologies such as a 2-D torus topology, a three dimensional (3-D) hypercube topology, an octagonal topology, etc. In other embodiments the NoC 202 may be an indirect topology, that is, a topology wherein a router may be coupled with more than one IP core. Such topologies may include, for example, a fat-tree topology, a three-stage butterfly topology, or some other topology.

Figure 3:
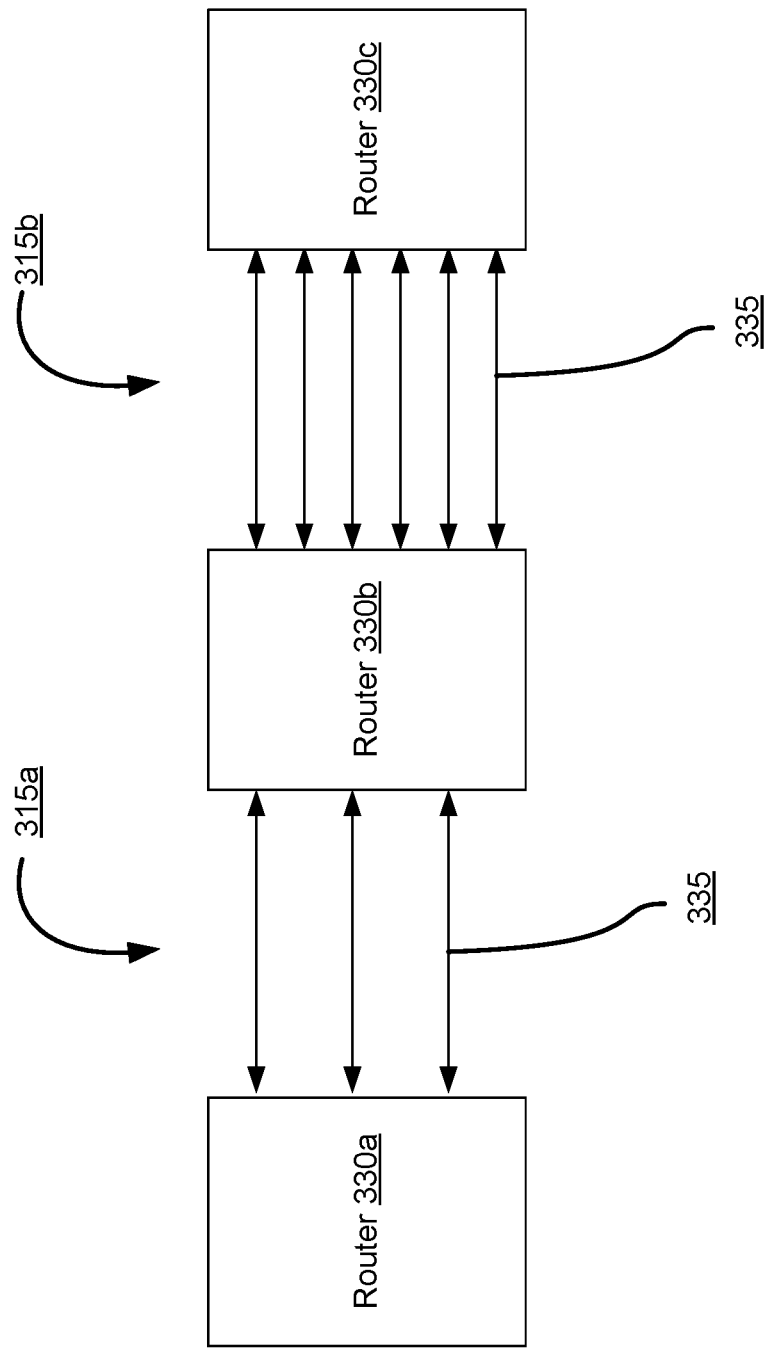
FIG. 3 depicts an example of connections between routers of a NoC, in accordance with various embodiments.

FIG. 3 depicts an example of connections between routers of a NoC, in accordance with various embodiments. For example, the NoC may be similar to NoC 202 of FIG. 2. The routers 330a, 330b, and 330c may be similar to routers 230 of FIG. 2 or router 130 of FIG. 1. The routers 330a, 330b, and 330c may be coupled with one another by signal buses such as signal buses 315a and 315b, which may be similar to signal buses 115 or 215.

As noted above, the signal buses 315a and 315b may include a plurality of signal wires 335. The signal wires 335 may be formed of some conductive material such as copper, gold, or some other conductive material that allows electronic signals to be conveyed between routers such as routers 330a and 330b.

As can be seen in FIG. 3, different signal buses may include a different number of signal wires. For example, signal bus 315a may only include three signal wires 335. By contrast, signal bus 315b may include six signal wires 335. It will be understood that signal buses 315a and 315b are intended only as examples, and in other embodiments the signal buses may include between 18 and 576 signal wires, or some other number of signal wires.

In embodiments, a router such as router 330b may receive a packet from router 330a via signalbus 315a. The packet may include one or more control bytes and one or more data bytes. The control byte(s) may be related to, for example, address information of the packet that indicates a component to which the packet is addressed. The control byte(s) may additionally or alternatively be related to, for example, routing information that indicates routing protocols related to the packet. The control byte(s) may additionally or alternatively be related to, for example, a transaction type of the packet that may indicate whether the packet is related to a transaction such as a read transaction, a write transaction, or some other type of transaction. The control byte(s) may additionally or alternatively be related to, for example, a command extension of the packet that may serve to modify or affect a command carried by the data portion of the packet. The control byte(s) may additionally or alternatively be related to, for example, security information related to the packet such as a checksum, encryption/decryption information, or some other type of information. In some embodiments the control byte(s) may include additional or alternative information.

As mentioned above, the packet may also include one or more data bytes. The data bytes may also be referred to as the "payload." The data bytes may include data information of the packet such as command data related to a command that is intended to be carried by the packet, information being carried to or from various components of a computing system, or some other type of data.

Figure 4:
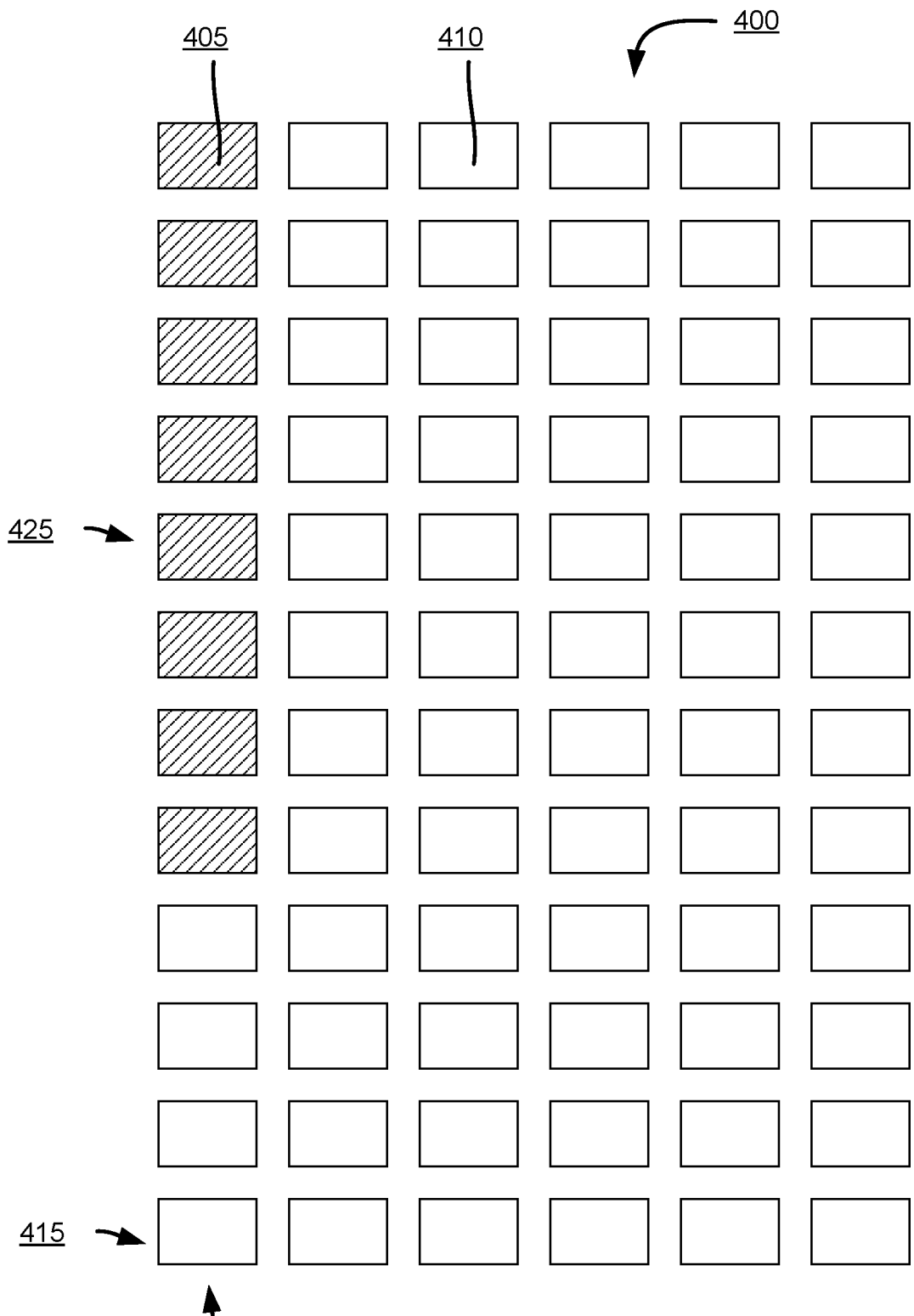
FIG. 4 depicts an example of a transmitted packet, in accordance with various embodiments.

FIG. 4 depicts an example of a transmitted packet, in accordance with various embodiments. Specifically, FIG. 4 depicts how a packet 400 may be transmitted along a signal bus such as signal bus 115/215/315a/315b. The packet may include one or more control bytes 405. For example, as shown in FIG. 4, the packet 400 may include eight control bytes 405. The packet may further include one or more data bytes 410. For example, as shown in FIG. 4, the packet 400 may include 64 data bytes 410.

The packet 400 may be split across a number of time instances and a number of signal wires. Specifically, each column in FIG. 4 may indicate a separate time instance. Each row may indicate a different signal wire over which the packet is transmitted.

As shown in FIG. 4, the packet 400 may be split into a plurality of flits 420. Generally, a flit 420 may include a number of bytes that are transmitted in a single time instance. As shown in FIG. 4, the packet 400 may include six flits. Bytes of the packet 400 may be transmitted along a number of signal wires 415, 425 over a plurality of time instances. For example, FIG. 4 indicates that the packet may be transmitted over 12 signal wires.

As used herein, the term "signal wire" may be an abstraction that may refer to a grouping of physical wires. For example, a signal wire, which may be able to transmit a byte of data, may include 8 physical wires, each capable of transmitting a bit of data.

As can be seen in FIG. 4, some signal wires such as signal wire 425 may transmit a control byte 405 in the first flit of the packet 400, and then data bytes 410 in the remaining flits. Other signal wires such as signal wire 415 may transmit a data byte 410 in each of the flits of the packet 400.

It will be understood that the packet 400 of FIG. 4, and particularly the number of flits, number of signal wires, number of control bytes, and number of data bytes, is intended as an example. In some embodiments, the packet 400 may be split such that the control bytes 405 are transmitted over four signal wires in two flits, rather than eight signal wires in one flit as shown in FIG. 4. In some embodiments, there may be more or fewer signal wires, cycles, control bytes, or data bytes in a packet.

Generally, the number of flits and how the data bytes and control bytes are arranged may depend on one or more factors such as the number of data bytes, the number of control bytes, and the number of signal wires. For example, returning to FIG. 3, if a packet has two control bytes and ten data bytes, it may be arranged differently if transmitted via signal bus 315a than if it were transmitted along signal bus 315b. For example, when transmitted on signal bus 315a, the packet may be transmitted in four flits. The first flit may include two control bytes and one data byte, and then three flits that include data bytes. The packet may then be redistributed for transmission on signal bus 315b such that it is transmitted in two flits. The first flit may include two control bytes and four data bytes, and the second flit may include six data bytes. Generally, the packet may be analyzed and the bytes may be assigned to the various signal wires by a switch in the IP block such as IP block 205, which may be coupled with a router such as router 330b.

Generally, the approach of being able to transmit both control and data bytes in a first flit, and then data bytes on all wires in a subsequent flit, can provide significant benefits. For example, this approach may lower latency not only for a first flit of a packet, but also for an entire data transfer cycle. The approach may also increase overall bandwidth of the NoC. When wormhole switching is used, the reduced amount of flits that result from this approach may reduce routing contention within the NoC.

The performance improvements that result from this approach may be significant with store-and-forward flow control, as the interface utilization may increase dramatically. Additionally, with store-and-forward switching, the techniques herein may reduce the overall storage size across the SoC interconnect, yielding noticeable area reduction.

Figure 5:
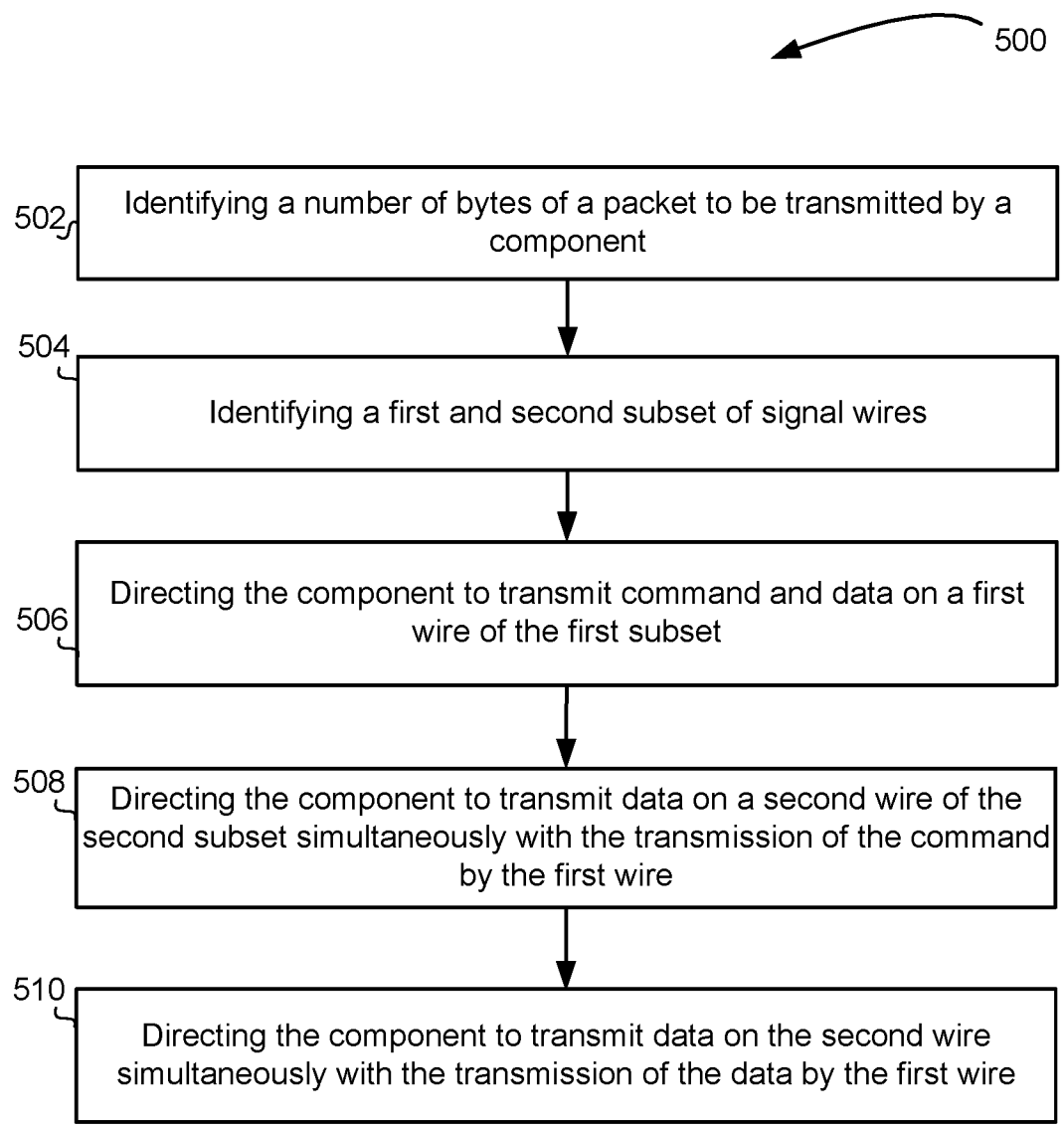
FIG. 5 depicts an example of a process of transmitting a packet, in accordance with various embodiments.

FIG. 5 depicts an example of a process of transmitting a packet, in accordance with various embodiments. Specifically, FIG. 5 depicts a process 500 that may be performed by a switch such as an IP block 105 or 205 to divide a packet such as packet 400 among a number of signal wires and flits.

The process 500 may include identifying, at 502, a number of bytes of a packet that are to be transmitted by a component. The packet may be, for example, packet 400 that includes a number of control bytes and a number of data bytes. The component may be, for example, a component such as router 330b, and the process 500 may be executed by an IP core such as IP core 105 that is coupled with the router.

The process 500 may then include identifying a first and a second subset of signal wires at 504. The signal wires may be, for example, signal wires of a signal bus coupled with the router as described above.

The process 500 may then include directing the component, e.g., the router, to transmit control and data on a first wire of the first subset at 506. With reference to FIG. 4, the first wire may be, for example, signal wire 425. The control element may be, for example, a control byte such as control byte 405. The data element may be, for example, a data byte such as data byte 410. The first subset may be, for example, the eight signal wires depicted in FIG. 4 that transmit a control byte in the first flit and then data bytes in the remaining flits.

The process 500 may also include directing the component, e.g., the router, to transmit data on a second wire of the second subset simultaneously with the transmission of the command by the first wire at 508. For example, the component (e.g., the router), may transmit a data byte such as data byte 410 on signal wire 415 in the first flit. This transmission, as it is in the same flit as the transmission of a control byte 405 on signal wire 425, may be considered to be generally simultaneous with the transmission of the control byte 405.

The process 500 may also include directing the component to transmit data on the second wire simultaneously with the transmission of data by the first wire at 510. For example, the wire 415 may transmit a data byte in the second flit, which may be the same flit as when signal wire 425 transmits a data byte.

It will be understood that the above described process 500 is intended as an example. Specifically, although the description of the process 500 may refer to the packet 400 of FIG. 4, in other embodiments process 500 may be executed on a packet with a different number of control or data bytes. Additionally, in some embodiments some of the elements may be executed generally simultaneously or in a different order than depicted in FIG. 5.

Figure 6:
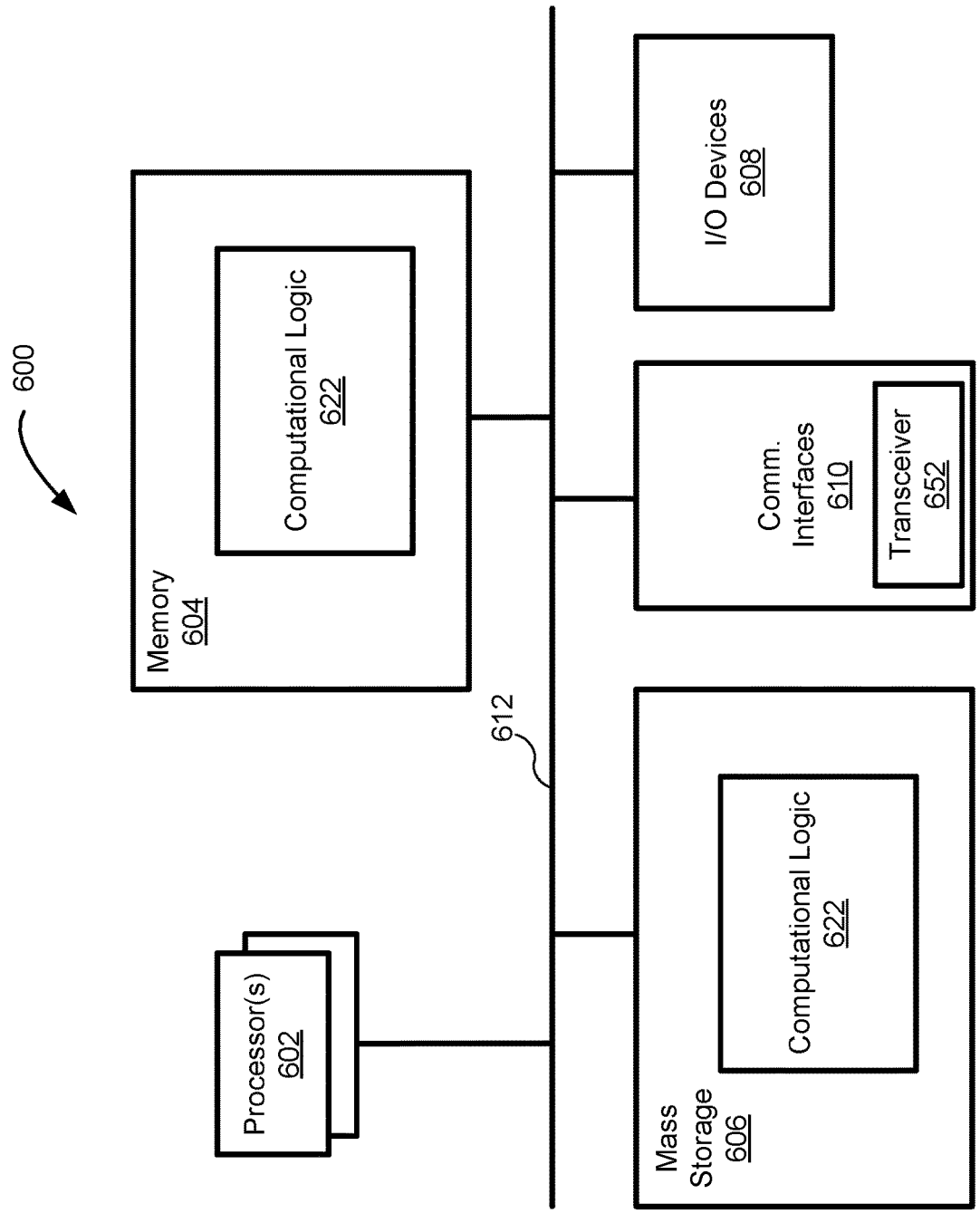
FIG. 6 is a block diagram of an example computing device, in accordance with various embodiments.

FIG. 6 illustrates a block diagram of an example computing device 600 suitable for use with various components of FIGS. 1-3, and the process 500 of FIG. 5, in accordance with various embodiments. For example, the computing device 600 may be, or may include or otherwise be coupled to, SoC 200. As shown, computing device 600 may include one or more processors or processor cores 602 and system memory 604. For the purpose of this application, including the claims, the terms "processor" and "processor cores" may be considered synonymous, unless the context clearly requires otherwise. The processor 602 may include any type of processors, such as a central processing unit (CPU), a microprocessor, and the like. The processor 602 may be implemented as an integrated circuit having multi-cores, e.g., a multi-core microprocessor. The computing device 600 may include mass storage devices 606 (such as diskette, hard drive, volatile memory (e.g., dynamic random access memory (DRAM), compact disc read-only memory (CD-ROM), digital versatile disk (DVD), and so forth)). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 600 may further include input/output (I/O) devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth).

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments. In various embodiments, the communication interfaces 610 may include a transceiver 652.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions for the operation of various components of computing device 600, including but not limited to an operating system of computing device 600 and/or one or more applications. The various elements may be implemented by assembler instructions supported by processor(s) 602 or high-level languages that may be compiled into such instructions.

The permanent copy of the programming instructions may be placed into mass storage devices 606 in the factory, or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computing device 600 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 604 may include computational logic 622 configured to implement various firmware and/or software services associated with operations of the computing device 600. For some embodiments, at least one of processors 602 may be packaged together with computational logic 622 configured to practice aspects of embodiments described herein to form a System in Package (SiP) or a System on Chip (SoC).

In various implementations, the computing device 600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 600 may be any other electronic device that processes data. In some embodiments, bus 612 may be, for example, an NoC such as NoC 202 as described above.

Figure 7:
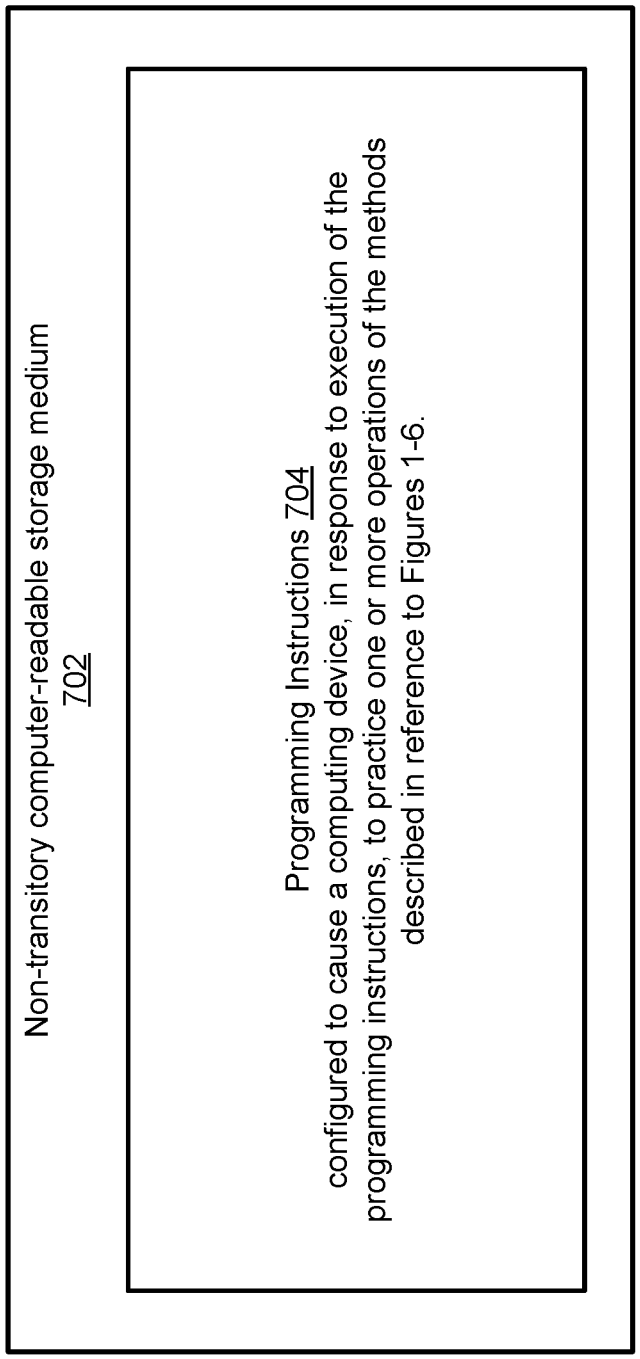
FIG. 7 illustrates an example storage medium with instructions configured to enable an apparatus to practice various aspects of the present disclosure, in accordance with various embodiments.

FIG. 7 illustrates example computer-readable storage medium 702 having instructions configured to practice all or selected ones of the operations associated with the computer device 600, earlier described with respect to FIG. 6; or the process 500 of FIG. 5, in accordance with various embodiments. As illustrated, computer-readable storage media 702 may include a number of programming instructions 704. The storage medium 702 may represent a broad range of non-transitory persistent storage medium known in the art, including but not limited to flash memory, dynamic random access memory, static random access memory, an optical disk, a magnetic disk, etc. Programming instructions 704 may be configured to enable a device, e.g., computing device 600, in response to execution of the programming instructions 704, to perform, e.g., but not limited to, various operations described with respect to process 500 of FIG. 5. In alternate embodiments, programming instructions 704 may be disposed on multiple computer-readable storage media 702. In alternate embodiments, storage medium 702 may be transitory, e.g., signals encoded with programming instructions 704.

Referring back to FIG. 6, for an embodiment, at least one of processors 602 may be packaged together with memory having all or portions of computational logic 622 configured to practice aspects shown or described herein with respect to process 500 of FIG. 5. For an embodiment, at least one of processors 602 may be packaged together with memory having all or portions of computational logic 622 configured to practice aspects described herein with respect to process 500 of FIG. 5 to form a System in Package (SiP). For an embodiment, at least one of processors 602 may be integrated on the same die with memory having all or portions of computational logic 622 configured to practice aspects described herein with respect to process 500 of FIG. 5. For an embodiment, at least one of processors 602 may be packaged together with memory having all or portions of computational logic 622 configured to practice aspects described herein with respect to process 500 of FIG. 5 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an apparatus comprising: a first component; a second component coupled with the first component by a plurality of signal wires; a first signal wire of the plurality of signal wires, the first signal wire to carry a control byte of a packet and a first data byte of the packet from the first component to the second component; and a second signal wire of the plurality of signal wires, the second signal wire to: carry a second data byte of the packet from the first component to the second component when the first signal wire carries the control byte of the packet; and carry a third data byte of the packet from the first component to the second component when the first signal wire carries the first data byte of the packet.

Example 2 may include the apparatus of example 1, wherein the plurality of signal wires are signal wires of a Network on Chip (NoC).

Example 3 may include the apparatus of example 1, wherein the plurality of signal wires include between 18 and 576 signal wires.

Example 4 may include the apparatus of example 1, wherein the control byte is related to control information, address information, routing information, transaction type, command extensions, or security information.

Example 5 may include the apparatus of example 1, wherein the control byte and the first data byte are transmitted in a first time slot; and the second data byte and the third data byte are transmitted in a second time slot.

Example 6 may include the apparatus of any of examples 1-5, further comprising a switch coupled with the plurality of signal wires, the switch to: facilitate transmission of the control byte and the first data byte on the first signal wire; and facilitate transmission of the second data byte and the third data byte on the second signal wire.

Example 7 may include the apparatus of example 6, wherein the first signal wire is a signal wire of a first subset of the plurality of signal wires and the second signal wire is a signal wire of a second subset of the plurality of signal wires; and wherein the switch is further to identify, based on a number of control bytes and a number of data bytes of the packet, a number of signal wires in the first subset and a number of signal wires in the second subset.

Example 8 may include the apparatus of any of examples 1-5, wherein the apparatus is a System on Chip (SoC).

Example 9 may include the apparatus of any of examples 1-5, wherein the first component is a router coupled with an intellectual property (IP) core.

Example 10 may include a method comprising: identifying, by a switch of a System on Chip (SoC), a number of bytes of a packet to be transmitted from a first component of the SoC to a second component of the SoC; identifying, by the switch based on the number of bytes of the packet, a first subset of signal wires of a plurality of signal wires and a second subset of signal wires of the plurality of signal wires; directing, by the switch, the first component to: transmit a control byte and a first data byte on a first wire of the first subset of signal wires; transmit a second data byte on a second wire of the second subset of signal wires simultaneously with the transmission of the control byte; and transmit a third data byte on the second wire simultaneously with the transmission of the first data byte.

Example 11 may include the method of example 10, wherein the plurality of signal wires are signal wires of a Network on Chip (NoC).

Example 12 may include the method of example 10, wherein the plurality of signal wires include between 18 and 576 signal wires.

Example 13 may include the method of example 10, wherein the control byte is related to control information, address information, routing information, transaction type, command extensions, or security information.

Example 14 may include the method of any of examples 10-13, further comprising: directing, by the switch, transmission of the control byte and the first data byte in a first time slot; and directing, by the switch, transmission of the second data byte and the third data byte in a second time slot.

Example 15 may include the method of any of examples 10-13, further comprising identifying, by the switch, a number of signal wires in the first subset and the second subset based on a number of control bytes of the packet and a number of data bytes of the packet.

Example 16 may include the method of any of examples 10-13, wherein the first component is a router coupled with an intellectual property (IP) core.

Example 17 may include a System on Chip (SoC) comprising: a first router; a second router coupled with the first router by a plurality of signal wires of a Network on Chip (NoC); and a switch coupled with the plurality of signal wires, wherein the switch is to: direct the first router to: transmit a control byte of a packet and a first data byte of the packet on a first wire of a first subset of the plurality of signal wires; transmit, in a same time slot as the transmission of the control byte, a second data byte of the packet on a second wire of a second subset of the plurality of signal wires; and transmit, in a same time slot as the transmission of the first data byte, a third data byte of the packet on the second wire.

Example 18 may include the SoC of example 17, wherein the plurality of signal wires include between 18 and 576 signal wires.

Example 19 may include the SoC of example 17, wherein the control byte is related to control information, address information, routing information, transaction type, command extensions, or security information.

Example 20 may include the SoC of any of examples 17-19, wherein a number of signal wires in the first subset is based on a number of control bytes of the packet and a number of data bytes of the packet.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. An apparatus comprising:
   a first component;
   a second component coupled with the first component by a plurality of signal wires;
   a first signal wire of the plurality of signal wires, wherein the first signal wire is to carry a control byte of a packet and a first data byte of the packet from the first component to the second component; and
   a second signal wire of the plurality of signal wires, wherein the second signal wire is to:
   carry a second data byte of the packet from the first component to the second component when the first signal wire carries the control byte of the packet; and
   carry a third data byte of the packet from the first component to the second component when the first signal wire carries the first data byte of the packet.

2. The apparatus of claim 1, wherein the plurality of signal wires are signal wires of a Network on Chip (NoC).

3. The apparatus of claim 1, wherein the plurality of signal wires include between 18 and 576 signal wires.

4. The apparatus of claim 1, wherein the control byte is related to control information, address information, routing information, transaction type, command extensions, or security information.

5. The apparatus of claim 1, wherein the control byte and the first data byte are transmitted in a first time slot; and
   the second data byte and the third data byte are transmitted in a second time slot.

6. The apparatus of claim 1, further comprising a switch coupled with the plurality of signal wires, the switch to:
   facilitate transmission of the control byte and the first data byte on the first signal wire; and
   facilitate transmission of the second data byte and the third data byte on the second signal wire.

7. The apparatus of claim 6, wherein the first signal wire is a signal wire of a first subset of the plurality of signal wires and the second signal wire is a signal wire of a second subset of the plurality of signal wires; and
   wherein the switch is further to identify, based on a number of control bytes and a number of data bytes of the packet, a number of signal wires in the first subset and a number of signal wires in the second subset.

8. The apparatus of claim 1, wherein the apparatus is a System on Chip (SoC).

9. The apparatus of claim 1, wherein the first component is a router coupled with an intellectual property (IP) core.

10. A method comprising:
    identifying, by a switch of a System on Chip (SoC), a number of bytes of a packet to be transmitted from a first component of the SoC to a second component of the SoC;
    identifying, by the switch based on the number of bytes of the packet, a first subset of signal wires of a plurality of signal wires and a second subset of signal wires of the plurality of signal wires;
    directing, by the switch, the first component to:
    transmit a control byte and a first data byte on a first wire of the first subset of signal wires;
    transmit a second data byte on a second wire of the second subset of signal wires simultaneously with the transmission of the control byte; and
    transmit a third data byte on the second wire simultaneously with the transmission of the first data byte.

11. The method of claim 10, wherein the plurality of signal wires are signal wires of a Network on Chip (NoC).

12. The method of claim 10, wherein the plurality of signal wires include between 18 and 576 signal wires.

13. The method of claim 10, wherein the control byte is related to control information, address information, routing information, transaction type, command extensions, or security information.

14. The method of claim 10, further comprising:
    directing, by the switch, transmission of the control byte and the first data byte in a first time slot; and
    directing, by the switch, transmission of the second data byte and the third data byte in a second time slot.

15. The method of claim 10, further comprising identifying, by the switch, a number of signal wires in the first subset and the second subset based on a number of control bytes of the packet and a number of data bytes of the packet.

16. The method of claim 10, wherein the first component is a router coupled with an intellectual property (IP) core.

17. A System on Chip (SoC) comprising:
    a first router;
    a second router coupled with the first router by a plurality of signal wires of a Network on Chip (NoC); and
    a switch coupled with the plurality of signal wires, wherein the switch is to:
    direct the first router to:
    transmit a control byte of a packet and a first data byte of the packet on a first wire of a first subset of the plurality of signal wires;
    transmit, in a same time slot as the transmission of the control byte, a second data byte of the packet on a second wire of a second subset of the plurality of signal wires; and
    transmit, in a same time slot as the transmission of the first data byte, a third data byte of the packet on the second wire.

18. The SoC of claim 17, wherein the plurality of signal wires include between 18 and 576 signal wires.

19. The SoC of claim 17, wherein the control byte is related to control information, address information, routing information, transaction type, command extensions, or security information.

20. The SoC of claim 17, wherein a number of signal wires in the first subset is based on a number of control bytes of the packet and a number of data bytes of the packet.

* * * * *